United States Patent [19]

Murata

[11] Patent Number: 4,590,533
[45] Date of Patent: May 20, 1986

[54] OVERVOLTAGE PROTECTIVE RELAY DEVICE

[75] Inventor: Masanori Murata, Hyogo, Japan

[73] Assignee: Mitsubishi Denki Kabushiki Kaisha, Tokyo, Japan

[21] Appl. No.: 516,342

[22] Filed: Jul. 22, 1983

[30] Foreign Application Priority Data

Jul. 24, 1982 [JP] Japan .................................. 57-130026

[51] Int. Cl.⁴ .......................... H02H 7/04; H02H 3/20
[52] U.S. Cl. ........................................ 361/91; 361/35; 361/86; 361/89; 340/662
[58] Field of Search ....................... 361/91, 89, 33, 86, 361/88, 96, 35; 328/147, 144; 340/662; 307/360, 361, 590

[56]  References Cited

U.S. PATENT DOCUMENTS

| 3,531,689 | 9/1970 | Horn ................................. 361/86 X |
| 4,250,532 | 2/1981 | Davis ..................................... 361/96 |
| 4,326,230 | 4/1982 | Becker et al. ......................... 361/89 |

Primary Examiner—Patrick R. Salce
Attorney, Agent, or Firm—Bernard, Rothwell & Brown

[57] ABSTRACT

A device for protecting from an overvoltage a power apparatus constituting an electric power system. The device comprises a plurality of detector means having respectively different voltage detection regions so as to attain preferably protection characteristic corresponding to the characteristic curve of the voltage-and-time product permissible for the power apparatus, a plurality of timer means for checking whether the durations of the outputs of the detector means exceed a respective predetermined time periods, and logic means for combining the respective outputs of the timer means through a predetermined logic operation.

8 Claims, 4 Drawing Figures

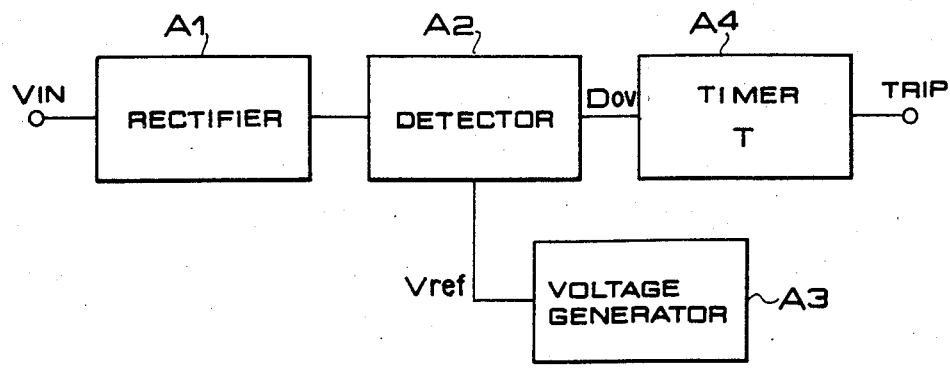
FIG. 1
(PRIOR ART)
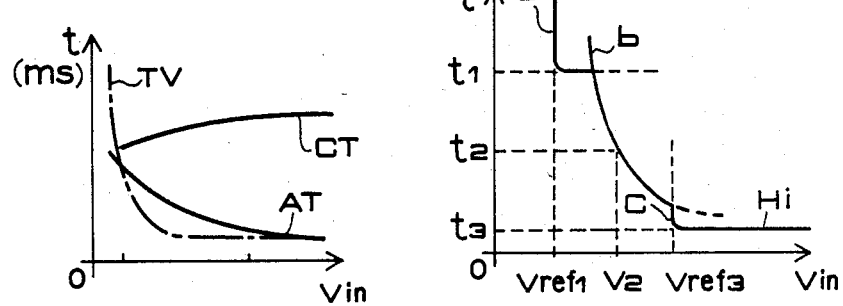
FIG. 2
(PRIOR ART)
FIG. 4

OVERVOLTAGE PROTECTIVE RELAY DEVICE

FIELD OF THE INVENTION

The present invention relates to a device adapted to protect a power apparatus in an electric power system from any overvoltage applied thereto, and more particularly to a relay device for protecting a transformer from such an overvoltage.

BACKGROUND OF THE INVENTION

When an overvoltage in excess of a predetermined value is applied to a power transformer in an electric power system continuously for more than a predetermined period of time, it is necessary to protect the transformer from such a voltage by interrupting the same, and this requisite function is achievable by the use of a protective relay device. However, such an overvoltage is generated due to a variety of reasons including faults that occur in the transformer itself and some other components in the electric power system; the relay device is thus required to have arrangement not to respond to any of mere transient overvoltages other than those resulting from the faults.

FIG. 1 is a block diagram of a conventional protective relay device, wherein an input voltage Vin applied to a power transformer (not shown) to be protected is introduced to a rectifying-smoothing circuit A1, so that the voltage Vin is rectified and smoothed to a DC voltage signal and then is applied to a DC level detector A2. The detector A2 compares the output voltage signal from the circuit A1 with a reference voltage Vref generated from a reference voltage generator A3, which is selected in accordance with the overvoltage to the power transformer. If the former voltage is higher, the detector A2 provides an overvoltage detection signal Dov to a timer A4.

The timer A4 is equipped with a time count function which is correspondingly set to a time period T of the duration of a transient voltage generated usually by a rush current in a transformer or on/off action of a switch in an electric power system, so that it produces a signal TRIP so long as the duration of the signal Dov exceeds the time period T. The signal TRIP serves to actuate an circuit breaker (not shown) for disconnecting the transformer from the overvoltage.

FIG. 2 graphically represents the response characteristic of the protective relay device shown in FIG. 1, wherein an input voltage Vin is plotted along the abscissa and a time t (ms) required for response is plotted along the ordinate. Lines AT and CT denote the operation time and the rest time of the relay device respectively, and a line TV denotes a threshold voltage-and-time product permissible for that power transformer. As is obvious from FIG. 2, the line AT has a considerable deviation from the line CT in achieving reliable protection of the transformer. With the detector A2 responsible to such a single reference voltage level, it is difficult to provide satisfactory response characteristic for the device.

An object of the present invention is to provide an overvoltage protective relay device which is capable of performing a highly reliable operation for protection of a power apparatus.

And another object of the invention is to provide an overvoltage protective relay device responsive accurately to any overvoltage in accordance with the characteristic curve of the voltage-and-time product permissible for a subjective power apparatus which is to be protected from the overvoltage.

SUMMARY OF THE INVENTION

These objects are accomplished by the overvoltage protective relay device according to this invention, wherein a voltage applied to a power apparatus constituting an electric power system is utilized as an input to the device, and in order to attain proper protection characteristic corresponding to the characteristic curve of the voltage-and-time product permissible for the power apparatus, a reference voltage for detecting an overvoltage from the input is established in relation to each of divided regions of the characteristic curve, and a reference time is also established from allowable duration of the input voltage which exceeds the reference voltage. And if the duration of the overvoltage exceeding the reference time is detected, a signal for protecting the power apparatus is generated.

BRIEF DESCRIPTION OF THE DRAWINGS

Fig. 1 is a block diagram of a conventional overvoltage protective relay device;

FIG. 2 graphically represents the operating characteristic of the device shown in FIG. 1;

FIG. 4 graphically represents the operating characteristic of the device shown in FIG. 3.

DESCRIPTION OF THE PREFERRED EMBODIMENT

Figure 3:
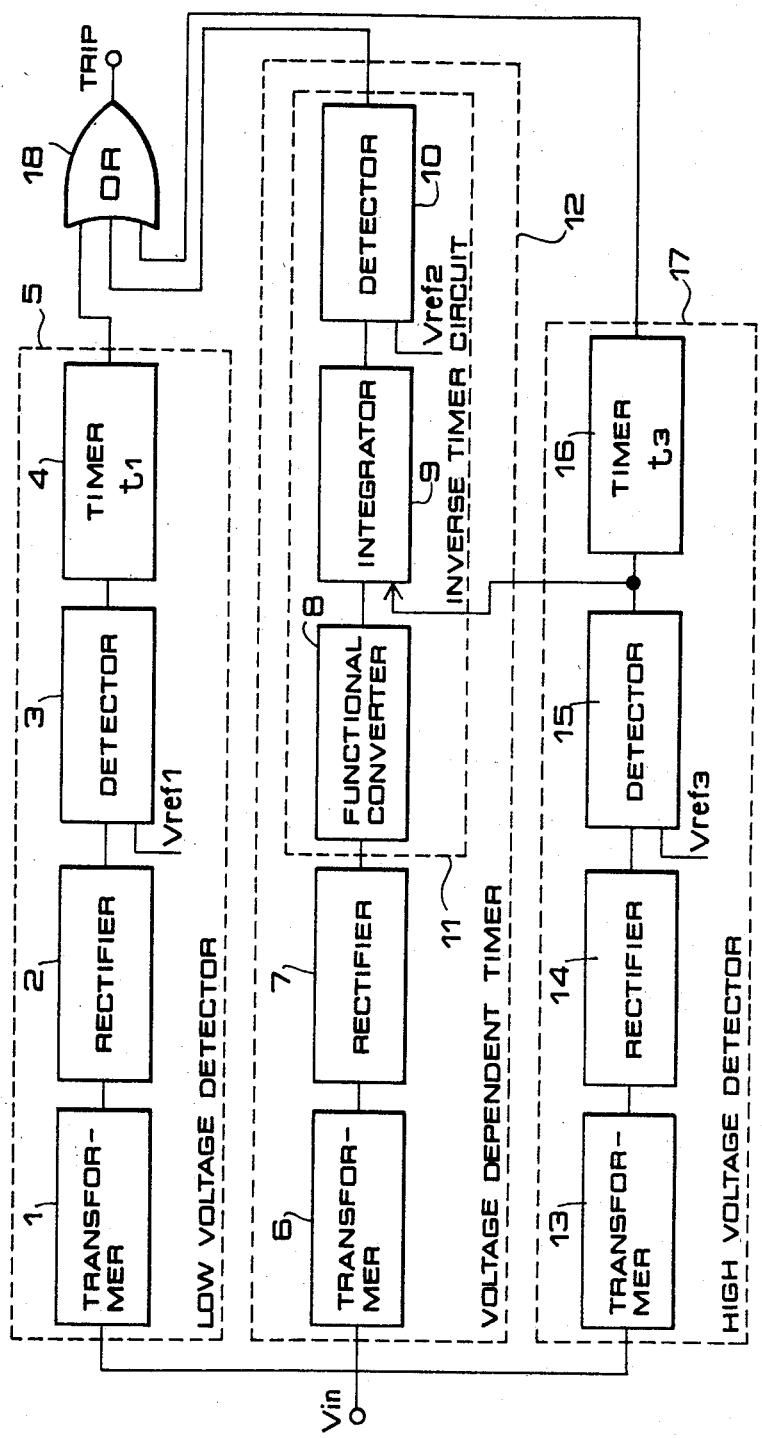
FIG. 3 is a block diagram of an overvoltage protective relay device embodying the present invention.

Referring to FIG. 3 which shows an overvoltage protective relay device embodying this invention, an input voltage Vin applied to a subjective power transformer (not shown) to be protected is linearly converted to a suitable voltage level by a voltage converter such as a voltage transformer 1, which is in turn introduced to a full-wave rectifier 2 which includes bridge connected diodes for rectifying the signal and a filter circuit for smoothing a rectified signal from the diodes. However, if a fast response is firstly required for the device, the filter circuit may be eliminated. The rectified signal is then fed to a voltage level detector 3 which consists of a voltage comparator for comparing it with a first reference voltage $V_{ref1}$ which is established correspondingly to the overvoltage to the power transformer. When the input thereto exceeds the voltage $V_{ref1}$, the output of the detector 3 is changed to a high level to be applied to an input of a timer 4, which is thereby actuated to initiate its time count operation. The timer 4 has a function to render its output level high when the input fed thereto becomes active for more than a predetermined duration of time $t_1$ which is selected in correspondence with the allowable duration of the overvoltage to the power transformer. In this configuration, the stages from the transformer 1 through the timer 4 constitute a low-voltage detector 5.

The input voltage Vin to the power transformer to be protected is also applied to a transformer 6 which has an output to be fed to a full-wave rectifier 7. These have the same arrangement as that of the transformer 1 and the rectifier 7 respectively. A DC signal from the rectifier 7 is subsequently fed to a functional converter 8 which has a predetermined response characteristic (e.g. inverse time characteristic) to its input, and has an output to be fed to an integrator 9 so as to be integrated therewith. The output signal of the integrator 9 is finally fed to a voltage level detector 10, which consists of a voltage comparator having a second predetermined reference voltage $V_{ref2}$ ($>V_{ref1}$) and changes its output to a high level when the input exceeds the reference voltage $V_{ref2}$. Thus, the stages from the converter 8 through the detector 10 constitute an inverse timer circuit 11, and further the stages from the transformer 6 through the circuit 11 constitute a voltage-dependent timer circuit 12.

The input voltage Vin to the power transformer to be protected is also applied to a transformer 13 having same arrangement as that of the transformer 1, and its output is fed to a full-wave rectifier 14 which also has the same type as that of the rectifier 2, where a DC signal is produced through full-wave rectification. The DC signal thus obtained is fed to a detector 15 which consists of a voltage comparator and has a third predetermined reference voltage $V_{ref3}$ ($>V_{ref2}>V_{ref1}$). When the input to the detector 15 exceeds $V_{ref3}$, the output thereof is changed to a high level and serves to reset the integrator 9 while actuating a timer 16, which has a function to render its output level high when the high-level duration of the output from the detector 15 exceeds a time $t_3$. Thus, the stages from the transformer 13 through the timer 16 constitute a high voltage detector 17.

The outputs of the timers 4, 16 and the detector 10 are sent to an OR gate 18, whose output is sent as a signal TRIP to a circuit breaker (not shown), which disconnects the voltage applied to the power transformer to be protected in response to the activation of the signal TRIP.

FIG. 4 is a graphic representation showing the operating characteristic of the device of FIG. 3 described hereinabove, wherein segmental lines a, b and c denote the threshold values in the individual response regions of the circuits 5, 12 and 17 respectively, i.e. the right side of the composite line illustrated is the response region.

In operation, there are three response modes to be considered. Firstly, when the input voltage Vin rises due to some abnormal state in the electric power system to increase the output of the rectifier 2 beyond the reference voltage $V_{ref1}$, the detector 3 produces a high-level output to actuate the timer 4. If the duration of the high-level output of the detector 3 becomes longer than the time $t_1$, the time 4 is permitted to produce a high-level output so that a signal TRIP is generated from the OR gate 18. In this case, the output levels of the detector 10 and the detector 15 are not rendered high since the outputs of the integrator 9 and the rectifier 14 are below the reference voltages $V_{ref2}$ and $V_{ref3}$ respectively.

Secondly, when the voltage Vin exceeds the voltage V2 as shown in FIG. 4 due to the same reason as the above and such a state is maintained for more than a predetermined time $t_2$ ($<t_1$), the resultant output of the integrator 9 exceeds the voltage $V_{ref2}$ to change the output of the detector 10 to a high level, whereby a signal TRIP is generated from the OR gate 18. In this case, the integration constant of the integrator 9 is properly selected such that the time $t_2$ required for the integrator output to reach the voltage $V_{ref2}$ of the detector 10 becomes shorter than the time $t_1$ of the timer 4, so that the output of the detector 10 is predominant over the output of the detector 5.

Thirdly, when the voltage Vin reaches the voltage $V_{ref3}$ as shown in FIG. 4 and such a state is maintained for more than a time $t_3$ ($<t_2$), the detector 15 produces a high-level output or "1" to actuate the timer 16, whose output is then changed to "1" after the lapse of a time $t_3$ from the moment when the voltage Vin becomes abnormal, thereby causing the OR gate 18 to generate a signal TRIP. Since the time $t_3$ of the timer 16 is less than the time $t_1$ of the timer 4 in this case and the integrator 9 is reset by the output of the detector 15, the output of the timer 16 is predominant.

As is obvious from FIG. 4, the overall characteristic curve composed of the segmental lines a, b and c is more nearly approximated to the line TV shown in FIG. 2, which make the relay device to respond correctly to the abnormal voltage applied to the power transformer.

It is clear to those skilled in the art that the circuits 5 and 17 may be constituted like the circuit 2 or, to the contrary, the latter may be constituted like the former.

What is claimed is:

1. An overvoltage protective relay device for protecting a power apparatus in an electric power system from an overvoltage, comprising:

means for converting a voltage applied to said power apparatus into a DC signal;

first and second detector means for generating detection signals respectively when the peak level of said DC signal reaches overvoltages exceeding predetermined first and second reference voltages;

first and second timer means for generating signals when the detection signals from said first and second detector means are respectively maintained in a high-level for first and second predetermined time periods which are selected to be different from each other;

third timer means comprising voltage level converter means responsive to said DC signal in accordance with a predetermined response function, integrator means for integrating the output of said level converter means, and third detector means for detecting the peak level of the output of said integrator means, and generating a signal when the integrated output of said integrator means exceeds a predetermined third reference voltage which is selected to fall between said first and second reference voltages; and logic means for allowing to pass at least one of the output signals of said first, second and third timer means as a signal for disconnecting said power apparatus from the overvoltage.

2. The relay device as defined in claim 1, wherein said converting means comprises a full-wave rectifier having diodes for rectifying the voltage to generate said DC signal and a filtering circuit for smoothing said DC signal.

3. The relay device as defined in claim 1, wherein said converting means comprises a full-wave rectifier having diodes for rectifying the voltage to generate said DC signal.

4. The relay device as defined in claim 1, wherein said integrator means is reset when the output signal of said second detector means is activated.

5. The relay device as defined in claim 1, 2 or 3, wherein the first reference level of said first detector means is selected less than the second reference level of said second detector means.

6. The relay device as defined in claim 1, 2 or 3, wherein the time period of said first timer means is selected more than the time period of said second timer means.

7. The relay device as defined in claim 1, 2 or 3, wherein the expiration time of said third timer means is less than that of said first timer means, but more than that of said second timer means.

8. The relay device as defined in claim 1, 2 or 3, wherein said logic means comprises an OR gate.

* * * * *

UNITED STATES PATENT AND TRADEMARK OFFICE
CERTIFICATE OF CORRECTION

PATENT NO. : 4,590,533

DATED : May 20, 1986

INVENTOR(S) : Masanori Murata

It is certified that error appears in the above-identified patent and that said Letters Patent is hereby corrected as shown below:

Column 4, line 19, the numeral "2" should be --12--.

Signed and Sealed this

Ninth Day of September 1986

[SEAL]

Attest:

DONALD J. QUIGG

Attesting Officer

Commissioner of Patents and Trademarks